United States Patent
Wu et al.

(10) Patent No.: US 11,619,515 B2
(45) Date of Patent: Apr. 4, 2023

(54) METHOD AND APPARATUS FOR PROCESSING POSITIONING DATA, DEVICE, STORAGE MEDIUM AND VEHICLE

(71) Applicant: APOLLO INTELLIGENT DRIVING TECHNOLOGY (BEIJING) CO., LTD., Beijing (CN)

(72) Inventors: Tong Wu, Beijing (CN); Renlan Cai, Beijing (CN); Gaifan Li, Beijing (CN); Jie Huang, Beijing (CN); Yijun Yuan, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 655 days.

(21) Appl. No.: 16/716,329

(22) Filed: Dec. 16, 2019

(65) Prior Publication Data

US 2020/0191579 A1  Jun. 18, 2020

(30) Foreign Application Priority Data

Dec. 18, 2018  (CN) .......................... 201811550374.5

(51) Int. Cl.
  *G01C 21/00* (2006.01)
  *G05D 1/00* (2006.01)
  *G06F 16/29* (2019.01)

(52) U.S. Cl.
  CPC ....... *G01C 21/3844* (2020.08); *G05D 1/0088* (2013.01); *G06F 16/29* (2019.01)

(58) Field of Classification Search
  CPC ........ G01C 21/32; G06F 16/29; G05D 1/0088
  (Continued)

(56) References Cited

U.S. PATENT DOCUMENTS

| | | | |
|---|---|---|---|
| 9,969,081 B2 | 5/2018 | Lacaze | |
| 2012/0059853 A1* | 3/2012 | Jagota | ..................... G06F 16/29 707/E17.014 |

(Continued)

FOREIGN PATENT DOCUMENTS

| | | |
|---|---|---|
| CN | 105928531 A | 9/2016 |
| CN | 107976182 A | 5/2018 |

(Continued)

OTHER PUBLICATIONS

The first Office Action of the priority CN application.
European Search Report.

*Primary Examiner* — Mahmoud S Ismail
(74) *Attorney, Agent, or Firm* — J.C. Patents

(57) ABSTRACT

Embodiments of the present disclosure provide a method and apparatus for processing positioning data, a device, a storage medium and a vehicle. In the method according to the embodiments of the present disclosure, the vehicle is controlled to collect positioning data continuously in the five stages including a first stage for performing dynamic alignment, a second stage for traveling along a path of a character "8", a third stage for collecting map data, a fourth stage for traveling along a path of the character "8", and a fifth stage for performing the dynamic alignment, and processing of error convergence is performed on the positioning data collected in the third stage, according to the positioning data collected in the first stage, the second stage, the fourth stage and the fifth stage, to obtain the final positioning data after the error convergence.

16 Claims, 6 Drawing Sheets

Controlling a vehicle to collect positioning data continuously in five stages which include a first stage for performing dynamic alignment, a second stage for traveling along a path of a character "8", a third stage for collecting map data, a fourth stage for traveling along a path of the character "8", and a fifth stage for performing the dynamic alignment ⟶ S101

Performing processing of error convergence on the positioning data collected in the third stage, according to the positioning data collected in the first stage, the second stage, the fourth stage and the fifth stage, to obtain final positioning data after the error convergence ⟶ S102

(58) Field of Classification Search
USPC .......................................................... 701/23
See application file for complete search history.

(56) References Cited

U.S. PATENT DOCUMENTS

2016/0111876 A1    4/2016  Cruz
2016/0189348 A1*  6/2016  Canter .................... G06T 5/002
                                                           382/154

FOREIGN PATENT DOCUMENTS

| CN | 108645420 A | 10/2018 |
|---|---|---|
| CN | 108731693 A | 11/2018 |
| CN | 108775901 A | 11/2018 |
| PT | 109778 A | 6/2018 |

* cited by examiner

METHOD AND APPARATUS FOR PROCESSING POSITIONING DATA, DEVICE, STORAGE MEDIUM AND VEHICLE

CROSS-REFERENCE TO RELATED APPLICATION

This application claims priority to Chinese Patent Application No. 201811550374.5, filed on Dec. 18, 2018, which is hereby incorporated by reference in its entirety.

TECHNICAL FIELD

The embodiments of the disclosure relate to the field of driverless technology, and in particular, to a method and apparatus for processing positioning data, a device, a storage medium and a vehicle.

BACKGROUND

With the continuous development of driverless technology, a driverless vehicle has higher and higher requirements for map accuracy. A driverless scene on or above an L4 level requires a high-accuracy map of centimeter level.

Forming the high-accuracy map highly relies on the accuracy of positioning data in collecting map data. However, positioning sensing devices used in collecting map data all have certain errors, and especially, for low-cost sensors that are not specifically used for map acquisition, the positioning errors are larger. The large errors of the positioning data in collecting the map data in the prior art cause low accuracy of the map formed based on the positioning data, and the requirements of the driverless vehicle cannot be satisfied.

SUMMARY

Embodiments of the present disclosure provide a method and apparatus for processing positioning data, a device, a storage medium and a vehicle, in order to solve the problem that large errors of positioning data in collecting map data in the prior art cause low accuracy of map formed based on the positioning data.

In a first aspect of the embodiments of the present disclosure, a method for processing positioning data is provided, which includes:

controlling a vehicle to collect positioning data continuously in five stages which include a first stage for performing dynamic alignment, a second stage for traveling along a path of a character "8", a third stage for collecting map data, a fourth stage for traveling along a path of the character "8", and a fifth stage for performing the dynamic alignment; and performing processing of error convergence on the positioning data collected in the third stage, according to the positioning data collected in the first stage, the second stage, the fourth stage and the fifth stage, to obtain final positioning data after the error convergence.

In another aspect of the embodiments of the present disclosure, an apparatus for processing positioning data is provided, which includes:

a data collecting module, configured to control a vehicle to collect positioning data continuously in five stages which include a first stage for performing dynamic alignment, a second stage for traveling along a path of a character "8", a third stage for collecting map data, a fourth stage for traveling along a path of the character "8", and a fifth stage for performing the dynamic alignment; and an error converging module, configured to perform processing of error convergence on the positioning data collected in the third stage, according to the positioning data collected in the first stage, the second stage, the fourth stage and the fifth stage, to obtain final positioning data after the error convergence.

In another aspect of the embodiments of the present disclosure, a device for vehicle control is provided, which includes:

a memory, a processor, and a computer program stored on the memory and executable on the processor, where when the computer program is executed by the processor, the above method for processing positioning data is implemented.

In another aspect of the embodiments of the present disclosure, a computer readable storage medium is provided, which has a computer program stored thereon, where when the computer program is executed by a processor, the above method for processing positioning data is implemented.

In another aspect of the embodiments of the present disclosure, a driverless vehicle is provided, which includes:

a positioning apparatus, configured to collect positioning data;

a map data collecting apparatus, configured to collect map data; and the device for vehicle control as described above.

In the method and apparatus for processing positioning data, the device, the storage medium and the vehicle according to the embodiments of the present disclosure, the vehicle is controlled to collect positioning data continuously in the five stages which includes the first stage for performing the dynamic alignment, the second stage for traveling along the path of the character "8", the third stage of collecting the map data, the fourth stage for traveling along the path of the character "8" and the fifth stage for performing the dynamic alignment; and the processing of error convergence is performed on the positioning data collected in the third stage, according to the positioning data collected in the first stage, the second stage, the fourth stage and the fifth stage, to obtain the final positioning data after the error convergence. The final positioning data is obtained by performing the forward error convergence and the backward error convergence on the positioning data collected in the third stage, which can reduce the error of the positioning data and improve the accuracy of the positioning data, and thereby can improve the accuracy of the electronic map formed according to the final positioning data.

Figure 1:
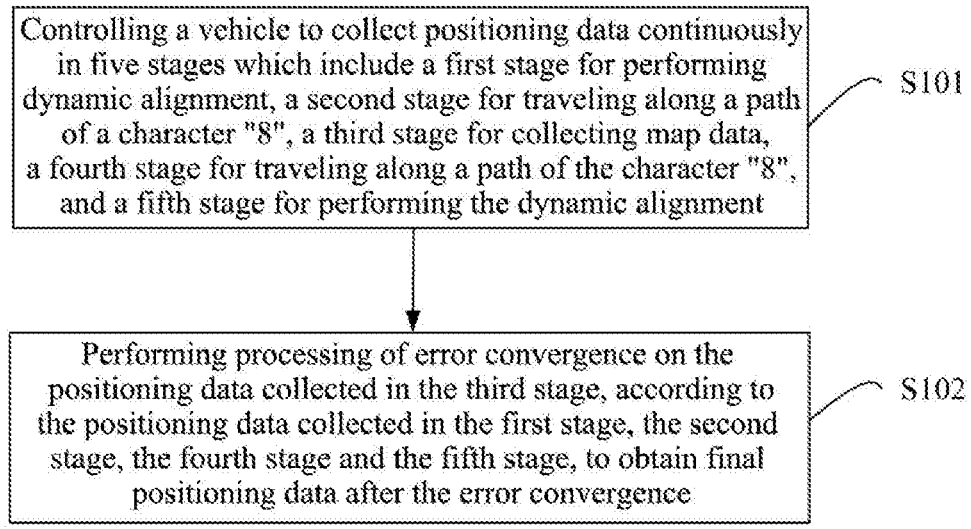
FIG. 1 is a flowchart of a method for processing positioning data according to Embodiment 1 of the present disclosure.

Specific embodiments of the present disclosure are illustrated through the above-mentioned drawings, and a more detailed description thereof will be described later. The drawings and description are not intended, by any means, to limit the scope of the conception of the embodiments of the present disclosure, instead, they are intended to illustrate the concepts of the present disclosure for those skilled in the art by referring to the specific embodiments.

DETAILED DESCRIPTION OF THE EMBODIMENTS

Exemplary embodiments will be described in detail herein, examples of which are illustrated in the drawings. Unless otherwise indicated, same numerals in different drawings indicate the same or similar elements, when the drawings are referred to in the following description. Implementations described in the following exemplary embodiments do not represent all implementations consistent with embodiments of the disclosure. Instead, they are merely examples of apparatus and methods consistent with some aspects of the embodiments of the disclosure as detailed in the appended claims.

The terms "first", "second", and the like, which are referred to in the embodiments of the present disclosure, are only used for the purpose of description, and they cannot be construed as indicating or implying a relative importance or implicitly indicating the number of technical features indicated. In the following description of the respective embodiments, the meaning of "a plurality of" is two or more, unless specifically defined otherwise.

The following specific embodiments may be combined with each other, and the same or similar concepts or processes may not be repeated in some embodiments. Embodiments of the present disclosure will be described below with reference to the drawings.

Embodiment 1

FIG. 1 is a flowchart of a method for processing positioning data according to Embodiment 1 of the present disclosure. This embodiment of the present disclosure provides a method for processing positioning data, in order to solve the problem that large errors of positioning data in collecting map data in the prior art cause low accuracy of a map formed based on the positioning data.

The method in this embodiment is applied to a control device of a vehicle that performs map acquisition, where the vehicle that performs map acquisition may be a driverless vehicle. The control device of the vehicle may an in-vehicle terminal or a remote control device. In other embodiments, the method may be applied to other devices. This embodiment is schematically illustrated by taking the in-vehicle terminal as an example.

As shown in FIG. 1, the specific steps of the method are as follows:

Step S101: controlling a vehicle to collect positioning data continuously in five stages which include a first stage for performing dynamic alignment, a second stage for traveling along a path of a character "8", a third stage for collecting map data, a fourth stage for traveling along a path of the character "8", and a fifth stage for performing the dynamic alignment.

In this embodiment, the data collection includes the five stages that are continuously performed without interruption. Before the collecting the map data, the following two stages are continuously performed for collecting positioning data: the first stage in which the vehicle is controlled to perform the dynamic alignment, that is, the vehicle is controlled to travel straight for a distance, and the positioning data is collected in the process of the dynamic alignment; and the second stage in which the vehicle is controlled to travel along the path of the character "8", and the positioning data is collected during the process of the vehicle travelling along the path of the character "8".

Then, in the third stage, the vehicle is controlled to travel in a site a map of which is to be formed, and the map data and positioning data are collected during the process of the travelling.

After the map data is collected, following two stages are continuously performed for collecting the positioning data: the fourth stage in which the vehicle is controlled to travel along the path of the character "8", and the positioning data is collected during the process of the vehicle travelling along the path of the character "8"; and the fifth stage in which the vehicle is controlled to perform the dynamic alignment, that is, the vehicle is controlled to travel straight for a distance, and the positioning data is collected in the process of the dynamic alignment.

Moreover, the data collection in this embodiment is substantially a data collection by a data collecting apparatus in the control of an in-vehicle terminal.

For example, when collecting the positioning data, the in-vehicle terminal controls a positioning apparatus to collect the positioning data, and the in-vehicle terminal receives the positioning data that is collected and transmitted in real time by the positioning apparatus.

For example, when collecting the map data, the in-vehicle terminal controls a map data collecting apparatus, e.g. a photographing device, a radar, or the like, to collect the map data. The in-vehicle terminal receives the map data that is collected and transmitted in real time by the map data collecting apparatus.

Step S102: performing processing of error convergence on the positioning data collected in the third stage, according to the positioning data collected in the first stage, the second stage, the fourth stage and the fifth stage, to obtain final positioning data after the error convergence.

After the above five stages are performed for collecting data, the in-vehicle terminal performs forward error convergence and backward error convergence on the positioning data collected in the third stage, according to the positioning data collected in the first stage, the second stage, the fourth stage and the fifth stage, to obtain the final positioning data, so as to reduce the error of the positioning data and improve the accuracy of the positioning data, and thereby the accuracy of the electronic map formed according to the final positioning data can be improved.

In this embodiment of the present disclosure, the vehicle is controlled to collect positioning data in the five stages which include the first stage for performing the dynamic alignment, the second stage for traveling along the path of the character "8", the third stage for collecting the map data, the fourth stage for traveling along the path of the character "8", and the fifth stage for performing the dynamic alignment; and the processing of error convergence is performed on the positioning data collected in the third stage, according to the positioning data collected in the first stage, the second stage, the fourth stage and the fifth stage, to obtain the final positioning data after the error convergence. The final positioning data is obtained by performing the forward error convergence and the backward error convergence on the positioning data collected in the third stage, which can reduce the error of the positioning data and improve the accuracy of the positioning data, and thereby can improve the accuracy of the electronic map formed according to the final positioning data.

Embodiment 2

Figure 2:
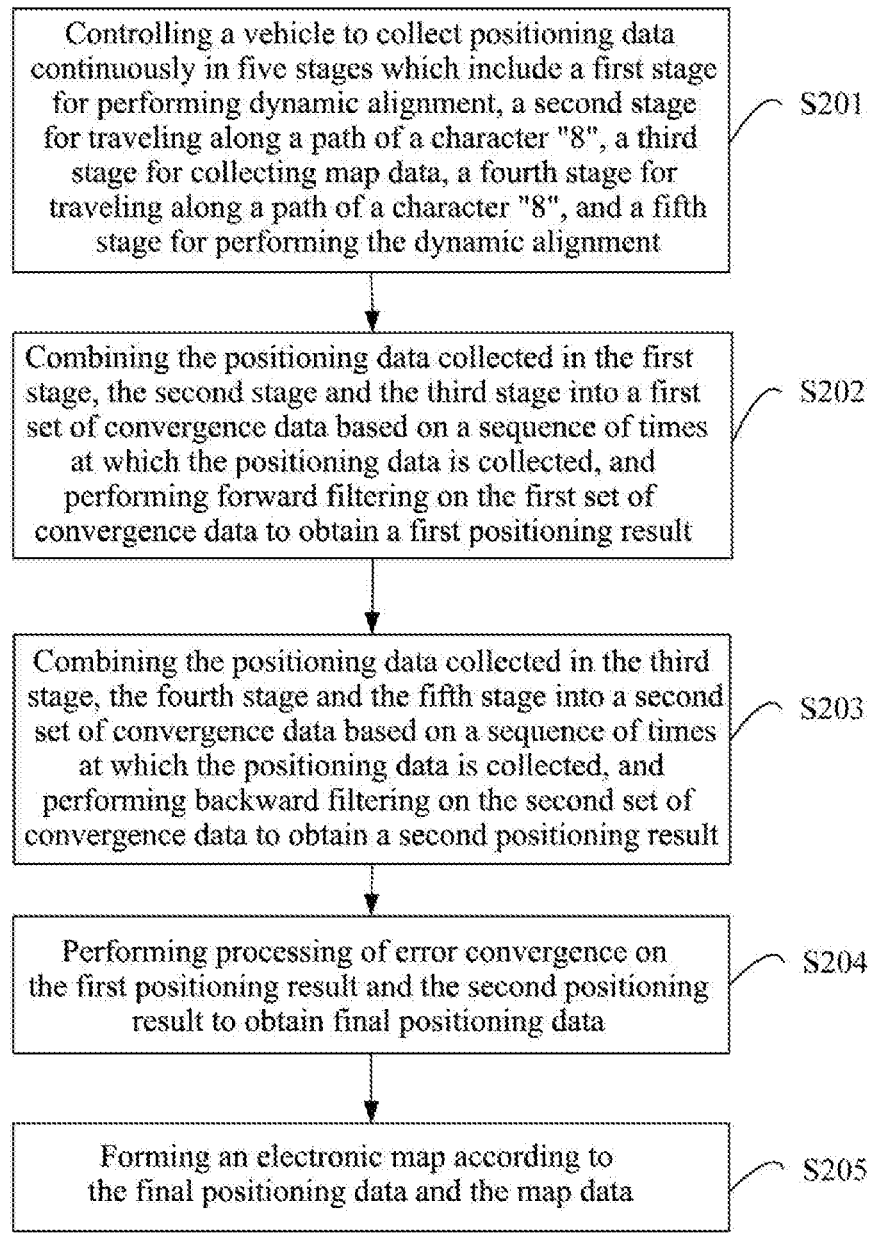
FIG. 2 is a flowchart of a method for processing positioning data according to Embodiment 2 of the present disclosure.

FIG. 2 is a flowchart of a method for processing positioning data according to Embodiment 2 of the present disclosure. On the basis of the Embodiment 1, in this embodiment, the performing processing of error convergence on the positioning data collected in the third stage, according to the positioning data collected in the first stage, the second stage, the fourth stage and the fifth stage, to obtain final positioning data after the error convergence includes: combining the positioning data collected in the first stage, the second stage and the third stage into a first set of convergence data based on a sequence of times at which the positioning data is collected, and performing forward filtering on the first set of convergence data to obtain a first positioning result; combining the positioning data collected in the third stage, the fourth stage and the fifth stage into a second set of convergence data based on a sequence of times at which the positioning data is collected, and performing backward filtering on the second set of convergence data to obtain a second positioning result; and performing processing of error convergence on the first positioning result and the second positioning result to obtain final positioning data. As illustrated in FIG. 2, the specific steps of the method are as follows:

Step S201: controlling a vehicle to collect positioning data continuously in five stages which include a first stage for performing dynamic alignment, a second stage for traveling along a path of a character "8", a third stage for collecting map data, a fourth stage for traveling along a path of a character "8", and a fifth stage for performing the dynamic alignment.

In this embodiment, the data collection includes the five stages that are continuously performed without interruption. Before the collecting the map data, following two stages are continuously performed for collecting positioning data: the first stage in which the vehicle is controlled to perform the dynamic alignment, that is, the vehicle is controlled to travel straight for a distance, and the positioning data is collected in the process of the dynamic alignment; and the second stage in which the vehicle is controlled to travel along the path of the character "8", and the positioning data is collected during the process of the vehicle travelling along the path of the character "8".

Then, in the third stage, the vehicle is controlled to travel in a site a map of which is to be formed, and the map data and positioning data are collected during the process of the travelling.

After the map data is collected, following two stages are continuously performed for collecting the positioning data: the fourth stage in which the vehicle is controlled to travel along the path of the character "8", and the positioning data is collected during the process of the vehicle travelling along the path of the character "8"; and the fifth stage in which the vehicle is controlled to perform the dynamic alignment, that is, the vehicle is controlled to travel straight for a distance, and the positioning data is collected in the process of the dynamic alignment.

Moreover, the data collection in this embodiment is substantially a data collection by a data collecting apparatus in the control of an in-vehicle terminal.

For example, when collecting the positioning data, the in-vehicle terminal controls a positioning apparatus to collect the positioning data, and the in-vehicle terminal receives the positioning data that is collected and transmitted in real time by the positioning apparatus.

For example, when collecting the map data, the in-vehicle terminal controls a map data collecting apparatus, e.g. a photographing device, a radar, or the like, to collect the map data. The in-vehicle terminal receives the map data that is collected and transmitted in real time by the map data collecting apparatus.

Step S202: combining the positioning data collected in the first stage, the second stage and the third stage into a first set of convergence data based on a sequence of times at which the positioning data is collected, and performing forward filtering on the first set of convergence data to obtain a first positioning result.

In this embodiment, the positioning data collected in the first stage, the second stage and the third stage is combined into the first set of convergence data based on the first to last sequence of the times at which the positioning data is collected, and a preset filter is used to perform the forward filtering on the first set of convergence data to obtain the first positioning result.

The performing the forward filtering on the first set of convergence data is referred to arranging the positioning data in the first set of convergence data according to the first to last sequence of the times at which the positioning data is collected, and using a preset filter to perform processing of filtering on the first set of convergence data.

In addition, the preset filter may be selected and set by a person skilled in the art according to actual scenarios and experience, which will not be specifically limited herein. For example, the preset filter may be a filter configured to filter out positioning data that is significant abnormal.

Step S203: combining the positioning data collected in the third stage, the fourth stage and the fifth stage into a second set of convergence data based on a sequence of times at which the positioning data is collected, and performing backward filtering on the second set of convergence data to obtain a second positioning result.

In this embodiment, the positioning data collected in the third stage, the fourth stage and the fifth stage is combined into the second set of convergence data based on the first to last sequence of the times at which the positioning data is collected, and then a preset filter is used to perform the backward filtering on the second set of convergence data to obtain the second positioning result.

The performing the backward filtering on the second set of convergence data is referred to arranging the positioning data in the second set of convergence data according to a reverse sequence of the times at which the positioning data is collected, that is, arranging the positioning data in the second set of convergence data according to a last to first sequence of times at which the positioning data is collected, and then the preset filter is used to perform processing of filtering on the data obtained by re-arranging the second set of convergence data according to the reverse sequence.

In addition, the preset filter may be selected and set by a person skilled in the art according to actual scenarios and experience, which will not be specifically limited herein. For example, the preset filter may be a filter configured to filter out positioning data that is significant abnormal.

In this embodiment, a filtering algorithm used in the forward filtering in step S202 and the backward filtering in step S203 may be the same. The processes of performing forward filtering in step S202 and performing backward filtering in step S203 may be performed in parallel or in any order, which will not be specifically limited herein.

Step S204: performing processing of error convergence on the first positioning result and the second positioning result to obtain final positioning data.

After the first positioning result that is forward filtered and the second positioning result that is backward filtered are obtained, the processing of error convergence may be performed on the first positioning result and the second positioning result to obtain the final positioning data.

Optionally, a feasible implementation of this step is:

calculating a covariance matrix of the first positioning result and a covariance matrix of the second positioning result; performing a weighted fusion on the first positioning result and the second positioning result, according to the covariance matrix of the first positioning result and the covariance matrix of the second positioning result, to obtain a third positioning result; and obtaining positioning data in the third positioning result corresponding to a time at which the map data is collected, according to the time at which the map data is collected, to obtain the final positioning data.

Optionally, another feasible implementation of this step is:

obtaining positioning data in the first positioning result corresponding to a time at which the map data is collected as a fourth positioning result, according to the time at which the map data is collected; obtaining positioning data in the second positioning result corresponding to the time at which the map data is collected as a fifth positioning result, according to the time at which the map data is collected; calculating a covariance matrix of the fourth positioning result and a covariance matrix of the fifth positioning result; and performing a weighted fusion on the fourth positioning result and the fifth positioning result, according to the covariance matrix of the fourth positioning result and the covariance matrix of the fifth positioning result, to obtain the final positioning data.

Moreover, in this embodiment, the method for obtaining a covariance matrix of a set of data, and performing a weighted fusion according to two sets of data and their covariance matrix may be implemented by a similar method in the prior art, which will not be further described in this embodiment.

Step S205: forming an electronic map according to the final positioning data and the map data.

After the final positioning data after the error convergence is determined, the electronic map is formed according to the final positioning data after the error convergence and the map data, which can improve the accuracy of the electronic map.

Moreover, forming the electronic map according to the final positioning data after the error convergence and the map data may be implemented by any method for forming an electronic map according to map data and positioning data in the prior art, which will not be further described in this embodiment.

In this embodiment of the present disclosure, the vehicle is controlled to collect positioning data continuously in the five stages which include the first stage for performing the dynamic alignment, the second stage for traveling along the path of the character "8", the third stage for collecting the map data, the fourth stage for traveling along the path of the character "8", and the fifth stage for performing the dynamic alignment; and the processing of error convergence is performed on the positioning data collected in the third stage, according to the positioning data collected in the first stage, the second stage, the fourth stage and the fifth stage, to obtain the final positioning data after the error convergence. The final positioning data is obtained by performing the forward error convergence and the backward error convergence on the positioning data collected in the third stage, which can reduce the error of the positioning data and improve the accuracy of the positioning data, and thereby can improve the accuracy of the electronic map formed according to the final positioning data.

Embodiment 3

Figure 3:
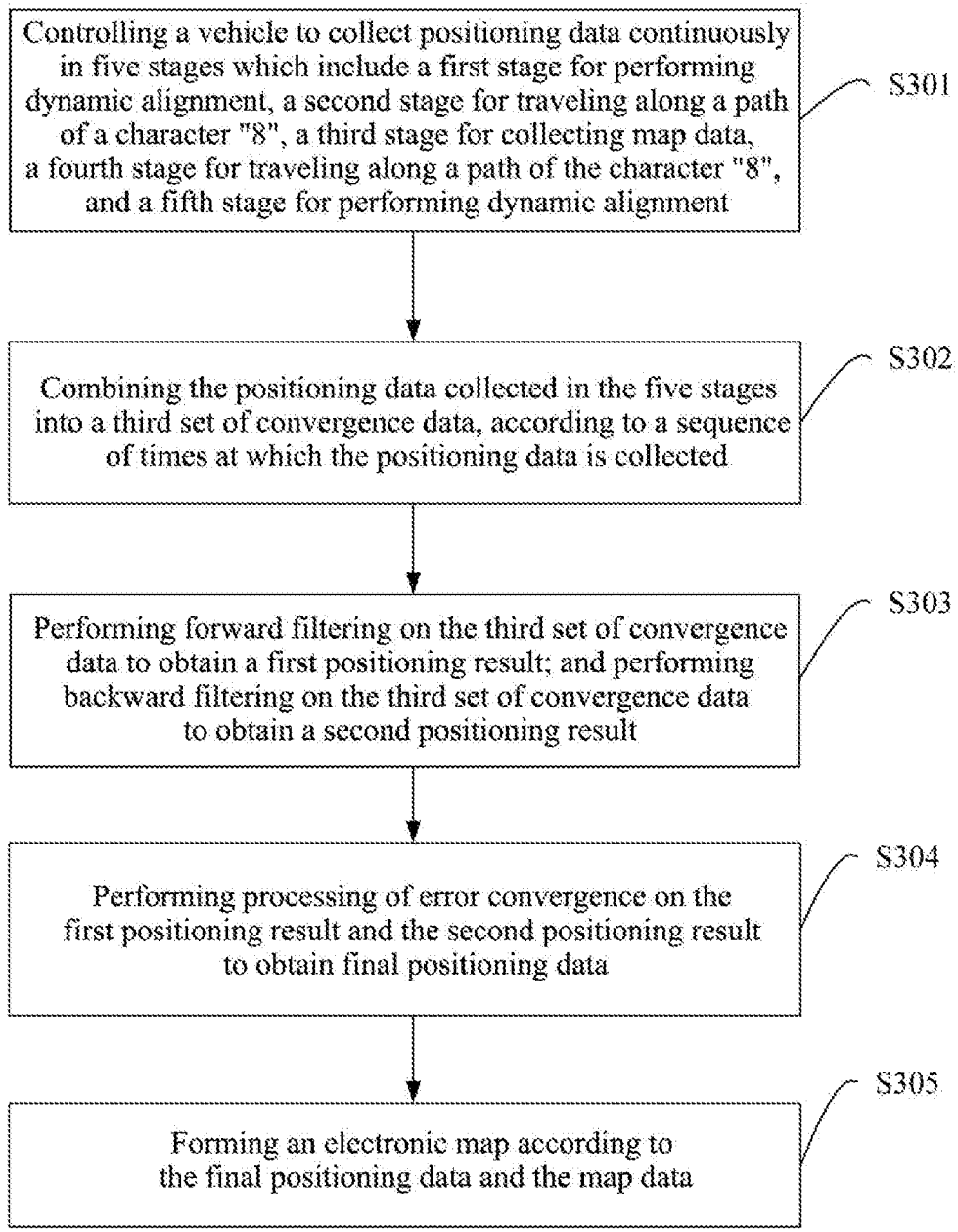
FIG. 3 is a flowchart of a method for processing positioning data according to Embodiment 3 of the present disclosure.

FIG. 3 is a flowchart of a method for processing positioning data according to Embodiment 3 of the present disclosure. Based on the Embodiment 1, in this embodiment, the performing processing of error convergence on the positioning data collected in the third stage, according to the positioning data collected in the first stage, the second stage, the fourth stage and the fifth stage, to obtain final positioning data after the error convergence includes: combining the positioning data collected in the five stages into a third set of convergence data, according to a sequence of times at which the positioning data is collected; performing forward filtering on the third set of convergence data to obtain a first positioning result; performing backward filtering on the third set of convergence data to obtain a second positioning result; and performing processing of error convergence on the first positioning result and the second positioning result to obtain the final positioning data. As illustrated in FIG. 3, the specific steps of the method are as follows:

Step S301: controlling a vehicle to collect positioning data continuously in five stages which include a first stage for performing dynamic alignment, a second stage for traveling along a path of a character "8", a third stage for collecting map data, a fourth stage for traveling along a path of the character "8", and a fifth stage for performing dynamic alignment.

Step S301 is the same as step S201, which will not be repeated in this embodiment.

Step S302: combining the positioning data collected in the five stages into a third set of convergence data, according to a sequence of times at which the positioning data is collected.

In this embodiment, the positioning data collected in the five stages is combined into the third set of convergence data according to the sequence of the times at which the positioning data is collected, and a preset filter is used to respectively perform forward filtering and backward filtering to obtain a first positioning result that is forward filtered and a second positioning result that is backward filtered.

Step S303: performing forward filtering on the third set of convergence data to obtain a first positioning result; and performing backward filtering on the third set of convergence data to obtain a second positioning result.

The performing the forward filtering on the third set of convergence data is referred to arranging the positioning data in the third set of convergence data according to the first to last sequence of the times at which the positioning data is collected, and using a preset filter to perform processing of filtering on the third set of convergence data.

The performing the backward filtering on the third set of convergence data is referred to arranging the positioning data in the third set of convergence data according to a reverse sequence of the times at which the positioning data is collected, that is, arranging the positioning data in the third set of convergence data according to a last to first sequence of times at which the positioning data is collected, and then a preset filter is used to perform processing of filtering on the data obtained by re-arranging the third set of convergence data according to the reverse sequence.

In this step, the forward filtering and the backward filtering the third set of convergence data may be performed in parallel or in any order, which will not be specifically limited herein.

In addition, the preset filter may be selected and set by a person skilled in the art according to actual scenarios and experience, which will not be specifically limited herein. For example, the preset filter may be a filter configured to filter out positioning data that is significant abnormal.

Step S304: performing processing of error convergence on the first positioning result and the second positioning result to obtain final positioning data.

This step is the same as step S204, which will not be repeated in this embodiment.

Step S305: forming an electronic map according to the final positioning data and the map data.

This step is the same as step S305, which will not be repeated in this embodiment.

In this embodiment of the present disclosure, the vehicle is controlled to collect positioning data continuously in five stages which include the first stage for performing dynamic alignment, the second stage for traveling along the path of the character "8", the third stage for collecting the map data, the fourth stage for traveling along the path of the character "8", and the fifth stage for performing the dynamic alignment; and the processing of error convergence is performed on the positioning data collected in the third stage, according to the positioning data collected in the first stage, the second stage, the fourth stage and the fifth stage, to obtain the final positioning data after the error convergence. The final positioning data is obtained by performing the forward error convergence and the backward error convergence on the positioning data collected in the third stage, which can reduce the error of the positioning data and improve the accuracy of the positioning data, and thereby can improve the accuracy of the electronic map formed according to the final positioning data.

Embodiment 4

Figure 4:
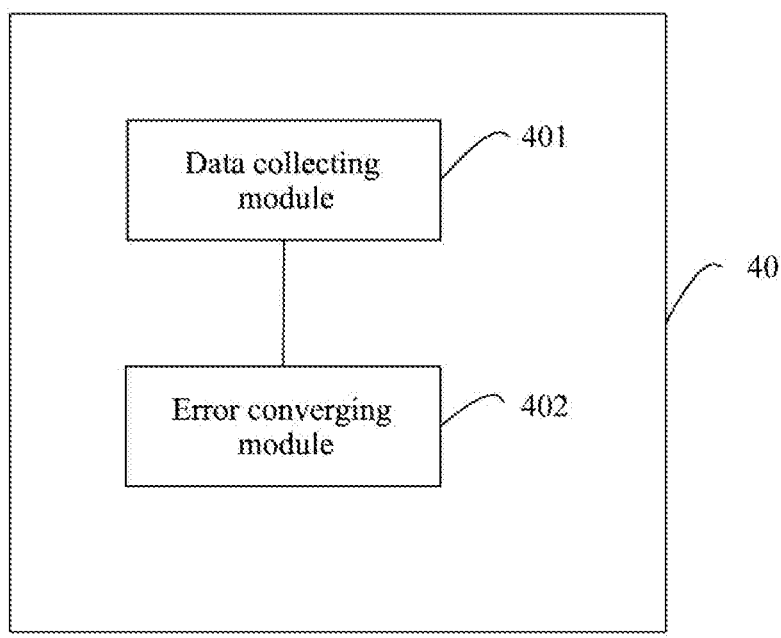
FIG. 4 is a schematic structural diagram of an apparatus for processing positioning data according to Embodiment 4 of the present disclosure.

FIG. 4 is a schematic structural diagram of an apparatus for processing positioning data according to Embodiment 4 of the present disclosure. The apparatus for processing positioning data according to this embodiment of the present disclosure may perform the processing flow according to the embodiment of the method for processing positioning data. As illustrated in FIG. 4, the apparatus for processing positioning data 40 includes: a data collecting module 401 and an error converging module 402.

Specifically, the data collecting module 401 is configured to control a vehicle to collect positioning data continuously in five stages which include a first stage for performing dynamic alignment, a second stage for traveling along a path of a character "8", a third stage for collecting map data, a fourth stage for traveling along a path of the character "8", and a fifth stage for performing the dynamic alignment.

The error converging module 402 is configured to perform processing of error convergence on positioning data collected in the third stage, according to the positioning data collected in the first stage, the second stage, the fourth stage and the fifth stage, to obtain final positioning data after the error convergence.

The apparatus according to this embodiment of the present disclosure may be specifically configured to perform the method embodiment according to Embodiment 1, and the functions of the apparatus will not be repeated herein.

In this embodiment of the present disclosure, the vehicle is controlled to collect positioning data continuously in five stages which include the first stage for performing the dynamic alignment, the second stage for traveling along the path of the character "8", the third stage for collecting the map data, the fourth stage for traveling along the path of the character "8", and the fifth stage for performing the dynamic alignment; and the processing of error convergence is performed on the positioning data collected in the third stage, according to the positioning data collected in the first stage, the second stage, the fourth stage and the fifth stage, to obtain the final positioning data after the error convergence. The final positioning data is obtained by performing the forward error convergence and the backward error convergence on the positioning data collected in the third stage, which can reduce the error of the positioning data and improve the accuracy of the positioning data, and thereby can improve the accuracy of the electronic map formed according to the final positioning data.

Embodiment 5

Figure 5:
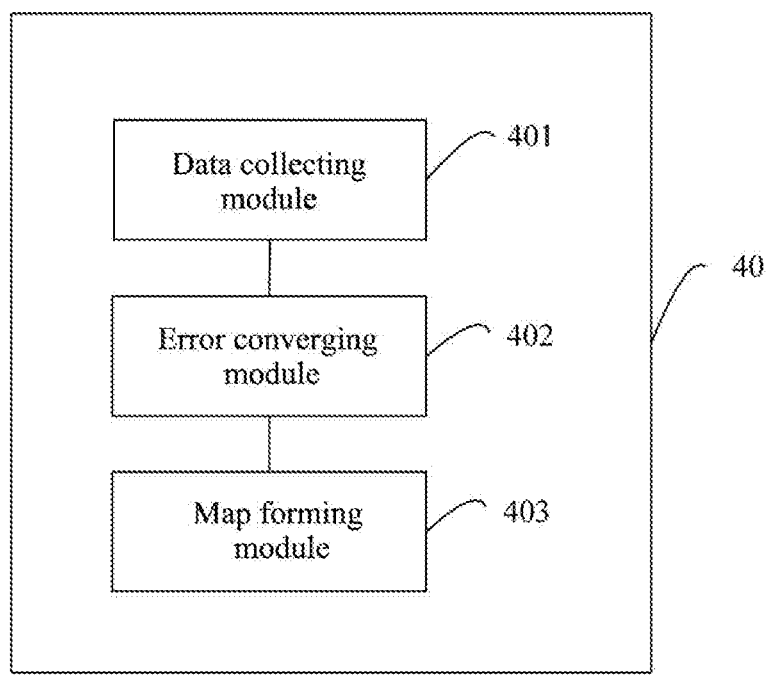
FIG. 5 is a schematic structural diagram of an apparatus for processing positioning data according to Embodiment 5 of the present disclosure.

FIG. 5 is a schematic structural diagram of an apparatus for processing positioning data according to Embodiment 5 of the present disclosure. Based on the above Embodiment 4, in this embodiment, as illustrated in FIG. 5, the apparatus for processing positioning data further includes: a map forming module 403.

The map forming module 403 is configured to: form an electronic map according to the final positioning data and the map data.

Optionally, the error converging module 402 is further configured to:

combine the positioning data collected in the first stage, the second stage and the third stage into a first set of convergence data based on a sequence of times at which the positioning data is collected, and perform forward filtering on the first set of convergence data to obtain a first positioning result; combine the positioning data collected in the third stage, the fourth stage and the fifth stage into a second set of convergence data based on a sequence of times at which the positioning data is collected, and perform backward filtering on the second set of convergence data to obtain a second positioning result; and perform the processing of error convergence on the first positioning result and the second positioning result to obtain the final positioning data.

Optionally, the error converging module 402 is further configured to:

combine the positioning data collected in the five stages into a third set of convergence data, according to a sequence of times at which the positioning data is collected; perform forward filtering on the third set of convergence data to obtain a first positioning result; perform backward filtering on the third set of convergence data to obtain a second positioning result; and perform the processing of error convergence on the first positioning result and the second positioning result to obtain the final positioning data.

Optionally, the error converging module 402 is further configured to:

calculate a covariance matrix of the first positioning result and a covariance matrix of the second positioning result; perform a weighted fusion on the first positioning result and the second positioning result, according to the covariance matrix of the first positioning result and the covariance matrix of the second positioning result, to obtain a third positioning result; and obtain positioning data in the third positioning result corresponding to a time at which the map data is collected, according to the time at which the map data is collected, to obtain the final positioning data.

Optionally, the error converging module 402 is further configured to:

obtain positioning data in the first positioning result corresponding to a time at which the map data is collected as a fourth positioning result, according to the time at which the map data is collected; obtain positioning data in the second positioning result corresponding to the time at which the map data is collected as a fifth positioning result, according to the time at which the map data is collected; calculate a covariance matrix of the fourth positioning result and a covariance matrix of the fifth positioning result; and perform a weighted fusion on the fourth positioning result and the fifth positioning result, according to the covariance matrix of the fourth positioning result and the covariance matrix of the fifth positioning result, to obtain the final positioning data.

The apparatus according to this embodiment of the present disclosure may be specifically configured to perform the method embodiment according to Embodiment 2 or Embodiment 3, and the functions of the apparatus will not be repeated herein.

In this embodiment of the present disclosure, the vehicle is controlled to collect positioning data continuously in five stages which include the first stage for performing the dynamic alignment, the second stage for traveling along the path of the character "8", the third stage for collecting the map data, the fourth stage for traveling along the path of the character "8", and the fifth stage for performing the dynamic alignment; and the processing of error convergence is performed on the positioning data collected in the third stage, according to the positioning data collected in the first stage, the second stage, the fourth stage and the fifth stage, to obtain the final positioning data after the error convergence. The final positioning data is obtained by performing the forward error convergence and the backward error convergence on the positioning data collected in the third stage, which can reduce the error of the positioning data and improve the accuracy of the positioning data, and thereby can improve the accuracy of the electronic map formed according to the final positioning data.

Embodiment 6

Figure 6:
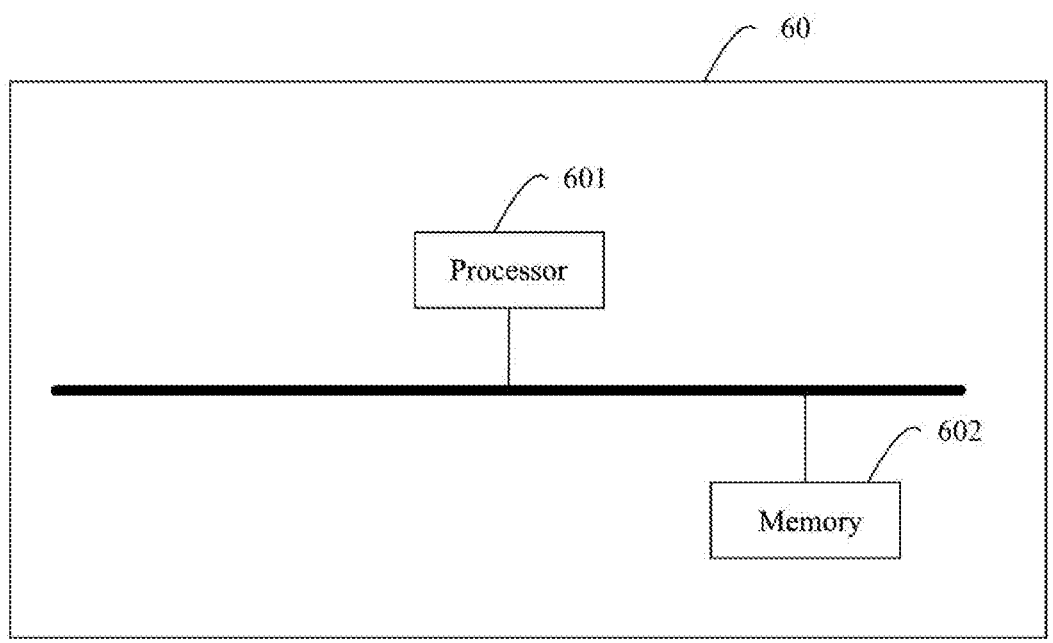
FIG. 6 is a schematic structural diagram of a device for vehicle control according to Embodiment 6 of the present disclosure.

FIG. 6 is a schematic structural diagram of a device for vehicle control according to Embodiment 6 of the present disclosure. As illustrated in FIG. 6, the device for vehicle control 60 includes: a processor 601, a memory 602, and a computer program stored on the memory 602 and executable by the processor 601.

The processor 601 implements the method for processing positioning data according to any one of the above method embodiments when executing the computer program stored on the memory 602.

In this embodiment of the present disclosure, the vehicle is controlled to collect positioning data continuously in five stages which include the first stage for performing the dynamic alignment, the second stage for traveling along the path of the character "8", the third stage for collecting the map data, the fourth stage for traveling along the path of the character "8", and the fifth stage for performing the dynamic alignment; and the processing of error convergence is performed on the positioning data collected in the third stage, according to the positioning data collected in the first stage, the second stage, the fourth stage and the fifth stage, to obtain the final positioning data after the error convergence. The final positioning data is obtained by performing the forward error convergence and the backward error convergence on the positioning data collected in the third stage, which can reduce the error of the positioning data and improve the accuracy of the positioning data, and thereby can improve the accuracy of the electronic map formed according to the final positioning data.

The embodiments of the present disclosure also provide a driverless vehicle, including: a positioning apparatus, a map data collecting apparatus, and a device for vehicle control.

The positioning apparatus is configured to collect positioning data.

The map data collecting apparatus is configured to collect map data;

The device for vehicle control is the device for vehicle control according to the above Embodiment 6.

In addition, the embodiments of the present disclosure also provide a computer readable storage medium having a computer program stored thereon, when the computer program is executed by a processor, the method for processing positioning data according to any one of the above method embodiments is implemented.

In the embodiments according to the present disclosure, it should be understood that the disclosed apparatuses and methods may be implemented in other manners. For example, the apparatus embodiments described above are merely illustrative. For example, the division of the unit is only a division of logical functions. In actual implementations, there may be another division manner, for example, multiple units or components may be combined or integrated into another system, or some features can be omitted or not executed. In addition, the mutual coupling or direct coupling or communication connection shown or discussed may be an indirect coupling or communication connection through some interfaces, devices or units, and may be in an electrical, a mechanical or other form.

The units described as separate components may or may not be physically separated, and the components illustrated as units may or may not be physical units, that is, may be located in one place, or may be distributed to multiple network units. Some or all of the units may be selected according to actual needs to achieve the purpose of the solutions of the embodiment.

In addition, various functional units in various embodiments of the present disclosure may be integrated into one processing unit, or various units may exist physically separately, or two or more units may be integrated into one unit. The above integrated units may be implemented in the form of hardware or in the form of hardware and software functional units.

The above-described integrated unit implemented in the form of a software functional unit can be stored in a computer readable storage medium. The above software functional unit is stored in a storage medium and includes several instructions to cause a computer device (which may be a personal computer, a server, or a network device, etc.) or a processor to perform some of the steps of the methods of the various embodiments of the present disclosure. The above-mentioned storage medium includes: a U disk, a mobile hard disk, a read-only memory (ROM), a random access memory (RAM), a magnetic disk, an optical disk, etc., which can store program codes.

A person skilled in the art can clearly understand that for the convenience and brevity of the description, the division of each functional module described above is only for exemplifying. In practical applications, the above functions may be assigned to be implemented by different functional modules as needed, that is, the internal structure of the apparatus is divided into different functional modules to perform all or part of the functions described above. For the specific working processes of the apparatuses described above, reference can be made to the corresponding processes in the foregoing method embodiments, which will not be repeated herein.

Other embodiments of the disclosure are readily apparent to those who skilled in the art, after the specification is taken into account and the disclosure disclosed herein is practiced. The present disclosure is intended to cover any variations, uses, or adaptations of the present disclosure, which are in accordance with the general principles of the disclosure and include common knowledge or common technical means in the art that are not disclosed in the present disclosure. The specification and embodiments are regarded as illustrative only, and the true scope and spirit of the disclosure are pointed out by the following claims.

It should be understood that, the present disclosure is not limited to the specific structures described above and illustrated in the drawings, and various modifications and changes can be made without departing from the scope thereof. The scope of the disclosure is limited only by the appended claims.

What is claimed is:

1. A method for processing positioning data, comprising:
controlling a vehicle to collect positioning data continuously in five stages which include a first stage for performing dynamic alignment, a second stage for traveling along a path of a character "8", a third stage for collecting map data, a fourth stage for traveling along a path of the character "8", and a fifth stage for performing the dynamic alignment; and
performing processing of a forward error convergence and a backward error convergence on the positioning data collected in the third stage, according to the positioning data collected in the first stage, the second stage, the fourth stage and the fifth stage, to obtain final positioning data after the forward error convergence and the backward error convergence.

2. The method according to claim 1, after the performing processing of the forward error convergence and the backward error convergence on the positioning data collected in the third stage, according to the positioning data collected in the first stage, the second stage, the fourth stage and the fifth stage, to obtain final positioning data after the forward error convergence and the backward error convergence, further comprising:
forming an electronic map according to the final positioning data and the map data.

3. The method according to claim 1, wherein the performing processing of the forward error convergence and the backward error convergence on the positioning data collected in the third stage, according to the positioning data collected in the first stage, the second stage, the fourth stage and the fifth stage, to obtain final positioning data after the forward error convergence and the backward error convergence comprises:
combining the positioning data collected in the first stage, the second stage and the third stage into a first set of convergence data based on a sequence of times at which the positioning data is collected, and performing forward filtering on the first set of convergence data to obtain a first positioning result;
combining the positioning data collected in the third stage, the fourth stage and the fifth stage into a second set of convergence data based on a sequence of times at which the positioning data is collected, and performing backward filtering on the second set of convergence data to obtain a second positioning result; and
performing the processing of error convergence on the first positioning result and the second positioning result to obtain the final positioning data.

4. The method according to claim 3, wherein the performing the processing of error convergence on the first positioning result and the second positioning result to obtain the final positioning data comprises:
obtaining positioning data in the first positioning result corresponding to a time at which the map data is collected as a fourth positioning result, according to the time at which the map data is collected;
obtaining positioning data in the second positioning result corresponding to the time at which the map data is collected as a fifth positioning result, according to the time at which the map data is collected;
calculating a covariance matrix of the fourth positioning result and a covariance matrix of the fifth positioning result; and
performing a weighted fusion on the fourth positioning result and the fifth positioning result, according to the covariance matrix of the fourth positioning result and the covariance matrix of the fifth positioning result, to obtain the final positioning data.

5. The method according to claim 1, wherein the performing processing of the forward error convergence and the backward error convergence on the positioning data collected in the third stage, according to the positioning data collected in the first stage, the second stage, the fourth stage and the fifth stage, to obtain final positioning data after the forward error convergence and the backward error convergence comprises:
combining the positioning data collected in the five stages into a third set of convergence data, according to a sequence of times at which the positioning data is collected;
performing forward filtering on the third set of convergence data to obtain a first positioning result;
performing backward filtering on the third set of convergence data to obtain a second positioning result; and
performing the processing of error convergence on the first positioning result and the second positioning result to obtain the final positioning data.

6. The method according to claim 3, wherein the performing the processing of error convergence on the first positioning result and the second positioning result to obtain the final positioning data comprises:
calculating a covariance matrix of the first positioning result and a covariance matrix of the second positioning result;
performing a weighted fusion on the first positioning result and the second positioning result, according to the covariance matrix of the first positioning result and the covariance matrix of the second positioning result, to obtain a third positioning result; and obtaining positioning data in the third positioning result corresponding to a time at which the map data is collected, according to the time at which the map data is collected, to obtain the final positioning data.

7. The method according to claim 5, wherein the performing the processing of error convergence on the first positioning result and the second positioning result to obtain the final positioning data comprises:
calculating a covariance matrix of the first positioning result and a covariance matrix of the second positioning result;
performing a weighted fusion on the first positioning result and the second positioning result, according to the covariance matrix of the first positioning result and the covariance matrix of the second positioning result, to obtain a third positioning result; and
obtaining positioning data in the third positioning result corresponding to a time at which the map data is collected, according to the time at which the map data is collected, to obtain the final positioning data.

8. The method according to claim 5, wherein the performing the processing of error convergence on the first positioning result and the second positioning result to obtain the final positioning data comprises:
obtaining positioning data in the first positioning result corresponding to a time at which the map data is collected as a fourth positioning result, according to the time at which the map data is collected;
obtaining positioning data in the second positioning result corresponding to the time at which the map data is collected as a fifth positioning result, according to the time at which the map data is collected;
calculating a covariance matrix of the fourth positioning result and a covariance matrix of the fifth positioning result; and
performing a weighted fusion on the fourth positioning result and the fifth positioning result, according to the covariance matrix of the fourth positioning result and the covariance matrix of the fifth positioning result, to obtain the final positioning data.

9. A system, comprising:
a memory, a processor, and a computer program stored on the memory and executable on the processor, wherein the computer program when being executed by the processor, causes the processor to:
control a vehicle to collect positioning data continuously in five stages which include a first stage for performing dynamic alignment, a second stage for traveling along a path of a character "8", a third stage for collecting map data, a fourth stage for traveling along the path of the character "8", and a fifth stage for performing the dynamic alignment; and
perform processing of error convergence on the positioning data collected in the third stage, according to the positioning data collected in the first stage, the second stage, the fourth stage and the fifth stage, to obtain final positioning data after the error convergence,
wherein the computer program further causes the processor to:
combine the positioning data collected in the first stage, the second stage and the third stage into a first set of convergence data based on a sequence of times at which the positioning data is collected, and perform forward filtering on the first set of convergence data to obtain a first positioning result;
combine the positioning data collected in the third stage, the fourth stage and the fifth stage into a second set of convergence data based on a sequence of times at which the positioning data is collected, and perform backward filtering on the second set of convergence data to obtain a second positioning result; and
perform the processing of error convergence on the first positioning result and the second positioning result to obtain the final positioning data.

10. The system according to claim 9, wherein the computer program further causes the processor to: form an electronic map according to the final positioning data and the map data.

11. The system according to claim 9, wherein the computer program further causes the processor to:
calculate a covariance matrix of the first positioning result and a covariance matrix of the second positioning result;
perform a weighted fusion on the first positioning result and the second positioning result, according to the covariance matrix of the first positioning result and the covariance matrix of the second positioning result, to obtain a third positioning result; and
obtain positioning data in the third positioning result corresponding to a time at which the map data is collected, according to the time at which the map data is collected, to obtain the final positioning data.

12. The system according to claim 9, wherein the computer program further causes the processor to:
obtain positioning data in the first positioning result corresponding to a time at which the map data is collected as a fourth positioning result, according to the time at which the map data is collected;
obtain positioning data in the second positioning result corresponding to the time at which the map data is collected as a fifth positioning result, according to the time at which the map data is collected;
calculate a covariance matrix of the fourth positioning result and a covariance matrix of the fifth positioning result; and
perform a weighted fusion on the fourth positioning result and the fifth positioning result, according to the covariance matrix of the fourth positioning result and the covariance matrix of the fifth positioning result, to obtain the final positioning data.

13. A driverless vehicle, comprising:
a positioning apparatus, configured to collect positioning data;
a map data collecting apparatus, configured to collect map data; and
the system according to claim 9.

14. A computer readable storage medium, having a computer program stored thereon, wherein
the computer program when being executed by a processor, causes the processor to:
control a vehicle to collect positioning data continuously in five stages which include a first stage for performing dynamic alignment, a second stage for traveling along a path of a character "8", a third stage for collecting map data, a fourth stage for traveling along a path of the character "8", and a fifth stage for performing the dynamic alignment, and
perform processing of a convergence on the positioning data collected in the third stage, according to the positioning data collected in the first stage, the second stage, the fourth stage and the fifth stage, to obtain final positioning data after the error convergence,
the computer program further causes the processor to:

combine the positioning data collected in the five stages into a third set of convergence data, according to a sequence of times at which the positioning data is collected;

perform forward filtering on the third set of convergence data to obtain a first positioning result;

perform backward filtering on the third set of convergence data to obtain a second positioning result; and perform the processing of error convergence on the first positioning result and the second positioning result to obtain the final positioning data.

15. The computer readable storage medium according to claim 14, the computer program further causes the processor to:

calculate a covariance matrix of the first positioning result and a covariance matrix of the second positioning result;

perform a weighted fusion on the first positioning result and the second positioning result, according to the covariance matrix of the first positioning result and the covariance matrix of the second positioning result, to obtain a third positioning result; and obtain positioning data in the third positioning result corresponding to a time at which the map data is collected, according to the time at which the map data is collected, to obtain the final positioning data.

16. The computer readable storage medium according to claim 14, the computer program further causes the processor to:

obtain positioning data in the first positioning result corresponding to a time at which the map data is collected as a fourth positioning result, according to the time at which the map data is collected;

obtain positioning data in the second positioning result corresponding to the time at which the map data is collected as a fifth positioning result, according to the time at which the map data is collected;

calculate a covariance matrix of the fourth positioning result and a covariance matrix of the fifth positioning result; and perform a weighted fusion on the fourth positioning result and the fifth positioning result, according to the covariance matrix of the fourth positioning result and the covariance matrix of the fifth positioning result, to obtain the final positioning data.

* * * * *